US010775612B2

(12) United States Patent
Shpunt et al.

(10) Patent No.: US 10,775,612 B2
(45) Date of Patent: Sep. 15, 2020

(54) RESONANT SCANNING MIRROR WITH BOTH MAGNETIC AND MECHANICAL TORSION SPRINGS

(71) Applicant: Apple Inc., Cupertino, CA (US)

(72) Inventors: Alexander Shpunt, Portola Valley, CA (US); Yuval Gerson, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 415 days.

(21) Appl. No.: 15/826,732

(22) Filed: Nov. 30, 2017

(65) Prior Publication Data

US 2018/0252914 A1    Sep. 6, 2018

Related U.S. Application Data

(60) Provisional application No. 62/467,149, filed on Mar. 5, 2017.

(51) Int. Cl.
*G01C 3/08* (2006.01)
*G02B 26/10* (2006.01)
*H02K 33/16* (2006.01)
*H02K 1/17* (2006.01)
*G01S 17/42* (2006.01)
*H02K 33/02* (2006.01)
*G01S 7/481* (2006.01)
*G01S 17/89* (2020.01)

(52) U.S. Cl.
CPC .......... *G02B 26/105* (2013.01); *G01S 7/4812* (2013.01); *G01S 7/4817* (2013.01); *G01S 17/42* (2013.01); *H02K 1/17* (2013.01); *H02K 33/02* (2013.01); *H02K 33/16* (2013.01); *G01S 17/89* (2013.01)

(58) Field of Classification Search
None
See application file for complete search history.

(56) References Cited

U.S. PATENT DOCUMENTS 3,959,673 A * 5/1976 Montagu ............. H02K 33/06
310/38
6,166,896 A * 12/2000 Schmitz ................... F01L 9/04
361/155

(Continued)

FOREIGN PATENT DOCUMENTS

| EP | 0671698 A2 * | 9/1995 | ......... G06K 7/10643 |
| JP | 10201285 A * | 7/1998 | |
| WO | 2014016794 A1 | 1/2014 | |

OTHER PUBLICATIONS

U.S. Appl. No. 15/807,605 office action dated Sep. 24, 2019.
Axelrod et al., U.S. Appl. No. 15/807,605, filed Nov. 9, 2017.

Primary Examiner — Yuqing Xiao
Assistant Examiner — Amir J Askarian
(74) Attorney, Agent, or Firm — Kligler & Associates Patent Attorneys Ltd

(57) ABSTRACT

Optical apparatus includes a shaft, which is configured to rotate about an axis of the shaft relative to a base. A mirror is fixed to the shaft so that the mirror rotates about the axis. A rotor including a permanent magnet is fixed to rotate with the shaft. A stator is configured to generate a magnetic field having a DC component in a vicinity of the rotor. A torsion spring, extending along the axis, has a first end that is attached to rotate with the shaft and a second end attached to the base.

18 Claims, 2 Drawing Sheets

(56) References Cited

U.S. PATENT DOCUMENTS

| | | | |
|---|---|---|---|
| 6,265,794 B1 | 7/2001 | DeBoalt | |
| 9,063,549 B1 * | 6/2015 | Pennecot | G01S 17/93 |
| 9,835,853 B1 | 12/2017 | Shpunt et al. | |
| 10,498,180 B2 * | 12/2019 | Liang | C22C 38/002 |
| 2002/0163701 A1 * | 11/2002 | Plesko | G02B 26/10 |
| | | | 359/199.3 |
| 2013/0207970 A1 | 8/2013 | Shpunt et al. | |
| 2014/0204431 A1 | 7/2014 | Tsuchiya | |
| 2017/0133953 A1 * | 5/2017 | Gross | H02N 2/186 |

* cited by examiner

RESONANT SCANNING MIRROR WITH BOTH MAGNETIC AND MECHANICAL TORSION SPRINGS

CROSS-REFERENCE TO RELATED APPLICATION

This application claims the benefit of U.S. Provisional Patent Application 62/467,149, filed Mar. 5, 2017, which is incorporated herein by reference.

FIELD OF THE INVENTION

The present invention relates generally to optical scanning, and particularly to methods and devices for scanning using a rotating mirror.

BACKGROUND

Scanning mirrors are used in a variety of applications, particularly in projecting and receiving beams of light. For example, U.S. Patent Application Publication 2013/0207970, whose disclosure is incorporated herein by reference, describes a scanning depth engine in which a transmitter emits a beam comprising pulses of light, and a scanner scans the beam, within a predefined scan range, over a scene. A receiver receives the light reflected from the scene and generates an output indicative of a time of flight of the pulses to and from points in the scene. A processor is coupled to control the scanner so as to cause the beam to scan over a selected window within the scan range and to process the output of the receiver so as to generate a 3D map of a part of the scene that is within the selected window.

Various means are known in the art for driving a scanning mirror. For example, PCT International Publication WO 2014/016794, whose disclosure is incorporated herein by reference, describes a dual-axis scanning mirror with a magnetic drive. The drive includes a stator assembly, which includes a core containing an air gap and one or more coils including conductive wire wound on the core so as to cause the core to form a magnetic circuit through the air gap in response to an electrical current flowing in the conductive wire. A scanning mirror assembly includes a support structure, a base, which is mounted to rotate about a first axis relative to the support structure, and a mirror, which is mounted to rotate about a second axis relative to the base. At least one rotor includes one or more permanent magnets, which are fixed to the scanning mirror assembly and which are positioned in the air gap so as to move in response to the magnetic circuit. A driver is coupled to generate the electrical current in the one or more coils.

SUMMARY

Embodiments of the present invention that are described hereinbelow provide scanning mirrors with enhanced performance.

There is therefore provided, in accordance with an embodiment of the invention, optical apparatus, including a shaft, which is configured to rotate about an axis of the shaft relative to a base. A mirro is fixed to the shaft so that the mirror rotates about the axis. A rotor including a permanent magnet is fixed to rotate with the shaft. A stator is configured to generate a magnetic field having a DC component in a vicinity of the rotor. A torsion spring, extending along the axis, has a first end that is attached to rotate with the shaft and a second end attached to the base.

In some embodiments, the DC component of the magnetic field of the stator defines an equilibrium angle of rotation of the shaft, at which the permanent magnet is aligned with the DC component of the magnetic field, and the torsion spring is configured to exert a torque between the first and second ends that increases with the rotation of the shaft away from the equilibrium angle. In a disclosed embodiment, the mirror is configured to oscillate at a resonant frequency of rotation about the equilibrium angle, wherein the resonant frequency is determined by a strength of the DC component of the magnetic field and a stiffness of the torsion spring.

Typically, the stator includes a permanent magnet, which generates the DC component.

Additionally or alternatively, the magnetic field generated by the stator includes an AC component, which drives the mirror to oscillate about the axis at a frequency of the AC component. In a disclosed embodiment, the stator includes a coil of conductive wire, which is driven with an AC electrical current so as to generate the AC component of the magnetic field. Further additionally or alternatively, the mirror is configured to oscillate about the axis at a resonant frequency, which is determined by a strength of the DC component of the magnetic field and a stiffness of the torsion spring, and the frequency of the AC component is chosen so as to drive the mirror at the resonant frequency.

In a disclosed embodiment, the apparatus includes a rotational bearing fixed between the shaft and the base, so that the shaft rotates in the bearing.

Additionally or alternatively, the apparatus includes a radiation source, which is configured to emit a beam of radiation toward the mirror, whereby the mirror deflects the beam in a scan pattern. In a disclosed embodiment, the mirror is configured to scan the beam over a scene, and the apparatus includes a detector, which is configured to receive, via the mirror, the radiation that is reflected from the scene.

There is also provided, in accordance with an embodiment of the invention, a method for scanning, which includes mounting a shaft to rotate about an axis of the shaft relative to a base and fixing a mirror to the shaft so that the mirror rotates about the axis. A rotor including a permanent magnet is fixed to rotate with the shaft within a magnetic field having a DC component that is generated by a stator. A first end of a torsion spring, extending along the axis, is attached to rotate with the shaft while a second end of the torsion spring is attached to the base.

The present invention will be more fully understood from the following detailed description of the embodiments thereof, taken together with the drawings in which:

DETAILED DESCRIPTION OF EMBODIMENTS

In some optical scanners that are based on a rotating mirror, such as those described above in the Background section, the mirror is driven to oscillate about its axis of rotation at a resonant frequency. This sort of resonant drive is advantageous in reducing power consumption and enhancing mechanical robustness of the scanner. Generally speaking, the resonant frequency $f_{res}$ is determined by the moment of inertia of the mirror I and the torsional stiffness k of the scanner about the axis of rotation:

$$f = \frac{1}{2\pi}\sqrt{\frac{k}{I}}$$

Increasing the stiffness k of the scanner will increase the resonant frequency, and hence facilitate faster scanning. Practically speaking, however, such an increase in stiffness often necessitates an increase in mass and size of the scanner, and may result in increased rotational damping and thus increased power consumption.

Embodiments of the present invention that are described herein address these difficulties by applying a novel combination of magnetic and mechanical means in order to increase the torsional stiffness of a scanner, and thus increase the resonant frequency, with minimal cost in terms of mass and damping.

In the disclosed embodiments, a mirror is fixed to a shaft, which is configured to rotate about its axis relative to a base. A rotor comprising a permanent magnet is fixed to rotate with the shaft, while a stator generates a magnetic field having a DC component in the vicinity of the rotor. (Typically, although not necessarily, the rotor is contained inside the stator.) The DC component of the magnetic field of the stator defines an equilibrium angle of rotation of the shaft, at which the rotor magnet is aligned with the DC component of the stator field. The magnetic force exerted by this DC field component on the rotor magnet acts as a sort of magnetic "spring," and thus contributes to the rotational stiffness of the scanner.

To increase the stiffness further, a torsion spring is connected along the shaft axis, with one end attached to the base, while the other end is attached to rotate with the shaft. As the mirror rotates, the torsion spring twists and thus exerts a mechanical torque between the shaft and the base that increases with the rotation of the shaft, in addition to the magnetic torque described above. The equilibrium angle of the torsion spring is typically (although not necessarily) set to be the same as the magnetic equilibrium angle.

Consequently, the overall stiffness of the scanner, and hence the resonant frequency of rotation of the mirror about the axis, is determined by the combined effects of the magnetic "spring" and the stiffness of the torsion spring. The resonant frequency is thus higher than could be practically achieved using the magnetic torque of mechanical torque on its own.

Figure 1:
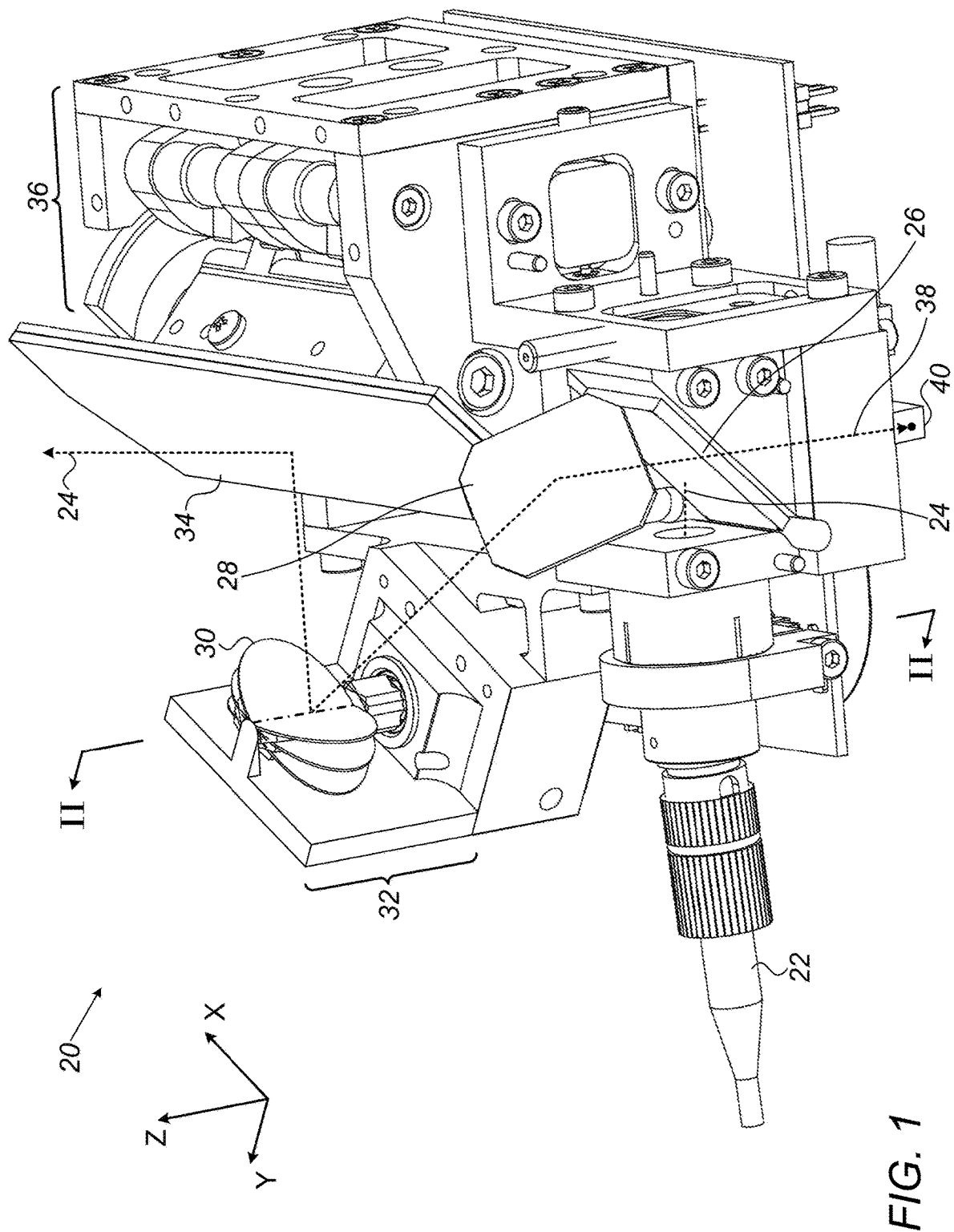
FIG. 1 is a schematic pictorial illustration of an optical scanning engine comprising a resonant scanning mirror assembly, in accordance with an embodiment of the invention.

FIG. 1 is a schematic pictorial illustration of an optical scanning engine 20 comprising a resonant scanning mirror assembly 32, in accordance with an embodiment of the invention. Engine 20 can be used, for example, in depth mapping systems of the sorts that are described above in the Background section. In this sort of system, a scanning mirror 30 in mirror assembly 32 can be used both in scanning a transmitted beam of radiation over a scene and in receiving reflected radiation from the scene. This is just one possible, illustrative use of mirror assembly 32, however, and other applications of the principles embodied in mirror assembly 32 will be apparent to those skilled in the art and are considered to be within the scope of the present invention. In these alternative embodiments, mirror 30 may be used to reflect transmitted radiation (pulsed or continuous), receive incoming radiation, or both.

Engine 20 comprises a radiation source 22, such as a pulsed laser, which emits a beam 24 of radiation to be transmitted toward a scene. Beam 24 reflects from a beamsplitter 26 (for example, a polarization-sensitive beamsplitter) and a turning mirror 28 toward scanning mirror 30. Mirror 30 oscillates resonantly about the Z-axis, as is illustrated schematically by the multiple replicas of the mirror that appear in FIG. 1. In the pictured embodiments, for the sake of convenience, the Z-axis is taken to be the axis of rotation, while the equilibrium position of mirror 30 is taken to define the X-Z plane. Thus, the oscillation of mirror 30 scans beam 24 in the X-Y plane.

Beam 24 reflects from mirror 30 toward a tilting mirror 34, which rotates about an axis in the X-Y plane. Thus, mirrors 30 and 34 together are capable of deflecting beam 24 in a two-dimensional scan pattern, such as a raster pattern. Mirror 34, which is much larger and more massive than mirror 30, is rotated by a scan motor 36, typically in a non-resonant mode, at a scan frequency substantially lower than the resonant frequency at which mirror 30 oscillates. Motor 36 may comprise any suitable sort of rotational drive that is known in the art, such as an electric motor drive or an electromagnetic drive.

Radiation reflected back from the scene strikes mirrors 34, 30 and 28 along a receive path 38 that is roughly parallel to transmitted beam 24. The received radiation passes through beamsplitter 26 and is focused onto a detector 40. A processing circuit (not shown) receives the output of detector 40 and, for example, constructs a depth map of the scene by measuring the times of flight of the transmitted pulses. These features of engine 20, however, are beyond the scope of the present description.

Figure 2:
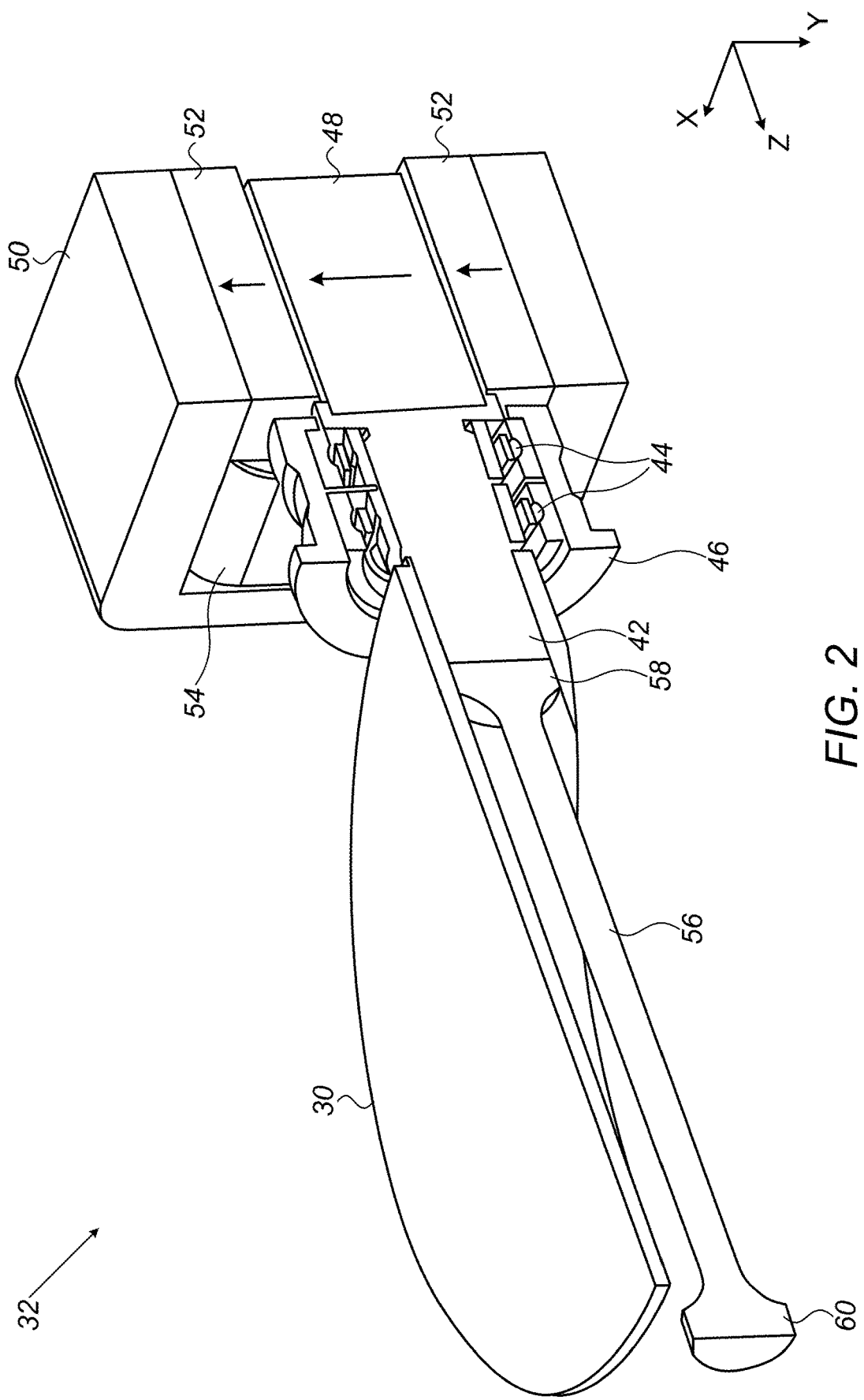
FIG. 2 is a schematic sectional illustration of the scanning mirror assembly used in the engine of FIG. 1, taken along the line II-II in FIG. 1, in accordance with an embodiment of the invention.

FIG. 2 is a schematic sectional illustration of scanning mirror assembly 32, taken along the line II-II in FIG. 1, in accordance with an embodiment of the invention. Mirror 30 is fixed to a shaft 42, which rotates in rotational bearings 44, which are contained in a stationary collar 46 that is a part of the base of assembly 32. Mirror 30 and shaft 42 thus rotate together about the shaft axis, which is taken to be the Z-axis for the sake of convenience in the present example. A rotor 48, comprising a permanent magnet, is fixed to shaft 42, and rotates (along with shaft 42 and mirror 30) within a stator 50. The magnetic moment of rotor 48 is indicated in the figure by a vertical arrow.

Stator 50 likewise comprises one or more permanent magnets 52, which generate a DC component of the magnetic field that is exerted by the stator in the vicinity of rotor 48. In the pictured example, the magnetic moments of magnets 52 (and hence the direction of the DC magnetic field component of stator 50) are oriented in the Y-direction, and thus define an equilibrium angle of rotation of shaft 42 at which the permanent magnet of rotor 48 is aligned with magnets 52, as shown in FIG. 2. When rotor 48 rotates away from this equilibrium angle, magnets 52 exert a sort of spring force, which increases with rotation angle and drives the rotor back toward the equilibrium angle. The spring force depends, as noted above, on the strength of the DC magnetic fields exerted by magnets 52, as well as the strength of the magnetic moment of rotor 48.

In addition to this magnetic spring force, a torsion spring 56 is connected between shaft 42 and the base of mirror assembly 32 in order to exert a mechanical torque that increases with the rotation of the shaft away from the equilibrium angle. For this purpose, an inner end 58 of torsion spring 56 is attached to shaft 42, while an outer end 60 is attached to the base of assembly 32 (as illustrated in FIG. 1). Torsion spring 56 comprises, for example, a suitable grade of tensile steel, such as AISI/SAE 4340 or SAE 1045 steel. Although torsion spring 56 is shown in FIG. 2, for the sake of visual clarity, as being distinct from shaft 42, in practice the torsion spring may be an integral part of the shaft, and the term "attached" in this context should be understood to include this sort of integral attachment.

The stiffness of torsion spring 56 and the magnetic spring force exerted by magnets 52 on rotor 48 together determine the overall torsional stiffness k, and hence the resonant frequency of oscillation of mirror 30. The strengths of the magnets and the stiffness of the spring may be chosen empirically to give the desired resonant frequency. For example, assuming mirror 30 to be about 2 cm in diameter, the resonant frequency of oscillation of mirror assembly 32 can conveniently be made as high as 1 kHz, while the overall package volume of the mirror assembly is no greater than about 50 cm$^3$. If either the magnetic spring or torsion spring were used alone, the achievable resonant frequency for this package size (or any given package size) would be considerably smaller.

To drive the oscillation of mirror 30, stator 50 comprises one or more coils 54 of conductive wire, which are driven with an AC electrical current so as to generate an AC magnetic field component. The frequency of the AC component is typically chosen so as to drive the mirror at the resonant frequency (meaning that the drive frequency is in a range in which the response of the mirror assembly is no less than a certain fraction of the peak response, for example, no less than half of the peak response). The use of the same rotor 48 and stator 50 in both a DC magnetic spring and an AC magnetic drive is another factor that enables assembly 32 to achieve a high resonant frequency in a small package.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
    a shaft, which is configured to rotate about an axis of the shaft relative to a base;
    a mirror, which is fixed to the shaft so that the mirror rotates about the axis;
    a rotor comprising a permanent magnet, which is fixed to rotate with the shaft;
    a stator, which is configured to generate a magnetic field having a DC component in a vicinity of the rotor,
    wherein the DC component of the magnetic field of the stator defines a first equilibrium angle of rotation of the shaft, at which the permanent magnet is aligned with the DC component of the magnetic field, and
    wherein the torsion spring has a second equilibrium angle of rotation that is equal to the first equilibrium angle and is configured to exert a torque between the first and second ends that increases with the rotation of the shaft away from the second equilibrium angle; and
    a torsion spring, extending along the axis and having a first end that is attached to rotate with the shaft and a second end attached to the base.

2. The apparatus according to claim 1, wherein the mirror is configured to oscillate at a resonant frequency of rotation about the first and second equilibrium angles, wherein the resonant frequency is determined by a strength of the DC component of the magnetic field and a stiffness of the torsion spring.

3. The apparatus according to claim 1, wherein the stator comprises a further permanent magnet, which generates the DC component.

4. The apparatus according to claim 1, wherein the magnetic field generated by the stator comprises an AC component, which drives the mirror to oscillate about the axis at a frequency of the AC component.

5. The apparatus according to claim 4, wherein the stator comprises a coil of conductive wire, which is driven with an AC electrical current so as to generate the AC component of the magnetic field.

6. The apparatus according to claim 4, wherein the mirror is configured to oscillate about the axis at a resonant frequency, which is determined by a strength of the DC component of the magnetic field and a stiffness of the torsion spring, and wherein the frequency of the AC component is chosen so as to drive the mirror at the resonant frequency.

7. The apparatus according to claim 1, and comprising a rotational bearing fixed between the shaft and the base, so that the shaft rotates in the bearing.

8. The apparatus according to claim 1, and comprising a radiation source, which is configured to emit a beam of radiation toward the mirror, whereby the mirror deflects the beam in a scan pattern.

9. The apparatus according to claim 8, wherein the mirror is configured to scan the beam over a scene, and wherein the apparatus comprises a detector, which is configured to receive, via the mirror, the radiation that is reflected from the scene.

10. A method for scanning, comprising:
    mounting a shaft to rotate about an axis of the shaft relative to a base;
    fixing a mirror to the shaft so that the mirror rotates about the axis;
    fixing a rotor comprising a permanent magnet to rotate with the shaft within a magnetic field having a DC component that is generated by a stator,
    wherein the DC component of the magnetic field of the stator defines a first equilibrium angle of rotation of the shaft, at which the permanent magnet is aligned with the DC component of the magnetic field, and
    wherein the torsion spring has a second equilibrium angle of rotation that is equal to the first equilibrium angle and is configured to exert a torque between the first and second ends that increases with the rotation of the shaft away from the second equilibrium angle; and
    attaching a first end of a torsion spring, extending along the axis, to rotate with the shaft while a second end of the torsion spring is attached to the base.

11. The method according to claim 10, wherein the mirror oscillates at a resonant frequency of rotation about the first and second equilibrium angles, wherein the resonant frequency is determined by a strength of the DC component of the magnetic field and a stiffness of the torsion spring.

12. The method according to claim 10, wherein the stator comprises a further permanent magnet, which generates the DC component.

13. The method according to claim 10, and comprising driving the stator to generate an AC component of the magnetic field, which drives the mirror to oscillate about the axis at a frequency of the AC component.

14. The method according to claim 13, wherein driving the stator comprises winding a coil of conductive wire on the stator, and driving the coil with an AC electrical current so as to generate the AC component of the magnetic field.

15. The method according to claim 13, wherein the mirror oscillates about the axis at a resonant frequency, which is determined by a strength of the DC component of the magnetic field and a stiffness of the torsion spring, and wherein the frequency of the AC component is chosen so as to drive the mirror at the resonant frequency.

16. The method according to claim 10, and comprising fixing a rotational bearing between the shaft and the base, so that the shaft rotates in the bearing.

17. The method according to claim 10, and comprising directing a beam of radiation toward the mirror, whereby the mirror deflects the beam in a scan pattern.

18. The method according to claim 17, wherein the mirror scans the beam over a scene, and wherein the method comprises receiving, via the mirror, the radiation that is reflected from the scene.

\* \* \* \* \*